United States Patent [19]
Kiwiet

[11] 3,835,360
[45] Sept. 10, 1974

[54] NUMERICAL CONTROL SYSTEM

[75] Inventor: William B. Kiwiet, Beaverton, Oreg.

[73] Assignee: Tektronix, Inc., Beaverton, Oreg.

[22] Filed: Mar. 20, 1972

[21] Appl. No.: 236,352

Related U.S. Application Data

[63] Continuation-in-part of Ser. Nos. 66,979, Aug. 26, 1970, , and Ser. No. 121,316, March 5, 1971.

[52] U.S. Cl................. 318/561, 318/571, 318/594, 318/621
[51] Int. Cl. ......................................... G05b 19/28
[58] Field of Search .......... 318/561, 594, 571, 603, 318/621

[56] References Cited
UNITED STATES PATENTS

| | | | |
|---|---|---|---|
| 3,389,243 | 6/1968 | Peschon | 318/561 X |
| 3,629,560 | 12/1971 | Slawson | 318/561 X |
| 3,651,392 | 3/1972 | Frisch | 318/561 |
| 3,693,064 | 9/1972 | Kiwiet | 318/571 |
| 3,721,882 | 3/1973 | Helms | 318/603 X |
| 3,729,668 | 4/1973 | Brette | 318/617 X |
| 3,731,177 | 5/1973 | Commander et al. | 318/603 |
| 3,737,751 | 6/1973 | Lima | 318/463 |

Primary Examiner—B. Dobeck
Attorney, Agent, or Firm—Klarquist, Sparkman, Campbell, Leigh, Hall & Whinston

[57] ABSTRACT

In a point-to-point control system of a modified, optimum, nonlinear type, a digital servomechanism employs an error counter receiving an input from a position-error-to-frequency-converter. The counter has a limited range, which, when exceeded, applies additional input to the servomechanism for producing rapid traverse. The error-to-frequency-converter normally receives a maximum input greater than the actual position error, until a deceleration range is detected, at which point the error-to-frequency-converter directs the servomechanism's error counter for bringing about rapid deceleration. The normal counter limits are also exceeded during deceleration for bringing about increased servomechanism gain and braking toward final position. As soon as substantial deceleration has taken place, such that the counter limits are no longer exceeded, the counter directs a deceleration which is linear with respect to the distance-to-go, for final, accurate servomechanism positioning.

25 Claims, 9 Drawing Figures

PATENTED SEP 10 1974  3,835,360

NUMERICAL CONTROL SYSTEM

CROSS REFERENCE TO RELATED APPLICATIONS

This is a continuation-in-part application of copending U.S. Ser. No. 66,979 filed Aug. 26, 1970 for Numerical Control System and U.S. Ser. No. 121,316 filed Mar. 5, 1971, for Numerical Control System.

BACKGROUND OF THE INVENTION

In nonlinear controls, as opposed to contouring controls for machine tools and the like, the speed of positioning is of more importance than the path taken by the part in achieving its final position. Thus a rapid traverse is frequently accomplished followed by a quick deceleration to the final position. Such a nonlinear control system, sometimes called a "bang-bang" servo, would be ideally suited for point-to-point operations in machine tools and the like, e.g., for rapidly positioning a drill bit from one location to another, if all the variables that affect the operation could be accurately predicted, such as friction, loading, motor constants, etc. Existing bang-bang servos do not provide sufficient accuracy or repeatability to be useful in numerical control systems.

SUMMARY OF THE INVENTION

In accordance with the present invention, a numerical control system for providing point-to-point operation rapidly traverses a controlled device at an optimized rate until a deceleration range is reached. At this time, optimized deceleration or rapid deceleration takes place until the controlled device reaches a final range within which velocity is related to the distance-to-go to the final desired position. Generally, the velocity is then proportional to the distance-to-go and exponential with respect to time, for bringing the controlled device accurately to its final position.

In accordance with another feature of the present invention, a numerical control system includes a digital servomechanism responsive to rate command means to provide movement of a controlled device, the digital servomechanism receiving feedback in accordance with movement of the controlled device. The digital servomechanism has a first range of response to the difference between the rate commanded and feedback. When this range is exceeded, the response or gain of the digital servomechanism is increased to a high output condition.

In accordance with an aspect of the present invention, means detect when a given positional error for the control device actually remains, at which time the aforementioned rate command means is directed to provide an output related to the remaining positional error. As a consequence, the digital servomechanism exceeds said first range and initiates optimum deceleration. When the control device decelerates to the point where feedback causes the servomechanism to operate within said first range, the control device will decelerate in a manner related to the remaining distance-to-go for final accurate positioning of such device.

The aforementioned digital servomechanism preferably includes an error counter wherein said first range constitutes a normal counting range of said error counter. The error counter need not have large capacity, since high servomechanism output is directed for optimized positioning when the range of the counter is exceeded.

According to an embodiment of the present invention, the error counter forms the difference between servomechanism feedback and the output of a rate command means comprising an error-to-frequency-converter. The error-to-frequency-converter is in turn responsive to a predetermined value or to an input positional error indication or "delta." When the error counter exceeds a predetermined range, either in a positive or negative direction, the additional servomechanism gain is applied for bringing the counter, via feedback, back toward an in-range condition. In some instances, a pulse-width modulated output results for application to an analog or power section of the servomechanism.

Further, according to an embodiment of the invention, a first input is provided to the aforementioned error-to-frequency-converter until the actual positional error indication falls within a predetermined range at which time deceleration is directed by applying the actual positional error indication as an input to the error-to-frequency-converter. As a consequence, the aforementioned predetermined range of the error counter will be exceeded resulting in optimized deceleration or braking until servomechanism feedback brings the error counter within such predetermined range. At this time, velocity becomes proportional to the remaining distance-to-go to final position.

It is accordingly an object of the present invention to provide an improved optimum, nonlinear control system.

It is a further object of the present invention to provide an improved optimum, nonlinear control system adapted for numerical control of machine tools.

It is a further object of the present invention to provide an improved optimum, nonlinear control system which is rapid in operation for achieving point-to-point positioning while also achieving accuracy in positioning.

It is another object of the present invention to provide an improved nonlinear control system which is accurate in operation and economical in construction.

It is a further object of the present invention to provide an improved point-to-point numerical control system for positioning machine tool elements and the like in a rapid manner with accuracy in final positioning.

It is a further object of the present invention to provide an improved optimum, nonlinear control system which is not dependent upon factors such as friction, loading, motor constants, and the like, but is adaptive to different conditions.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DETAILED DESCRIPTION

Figures 1, 2:
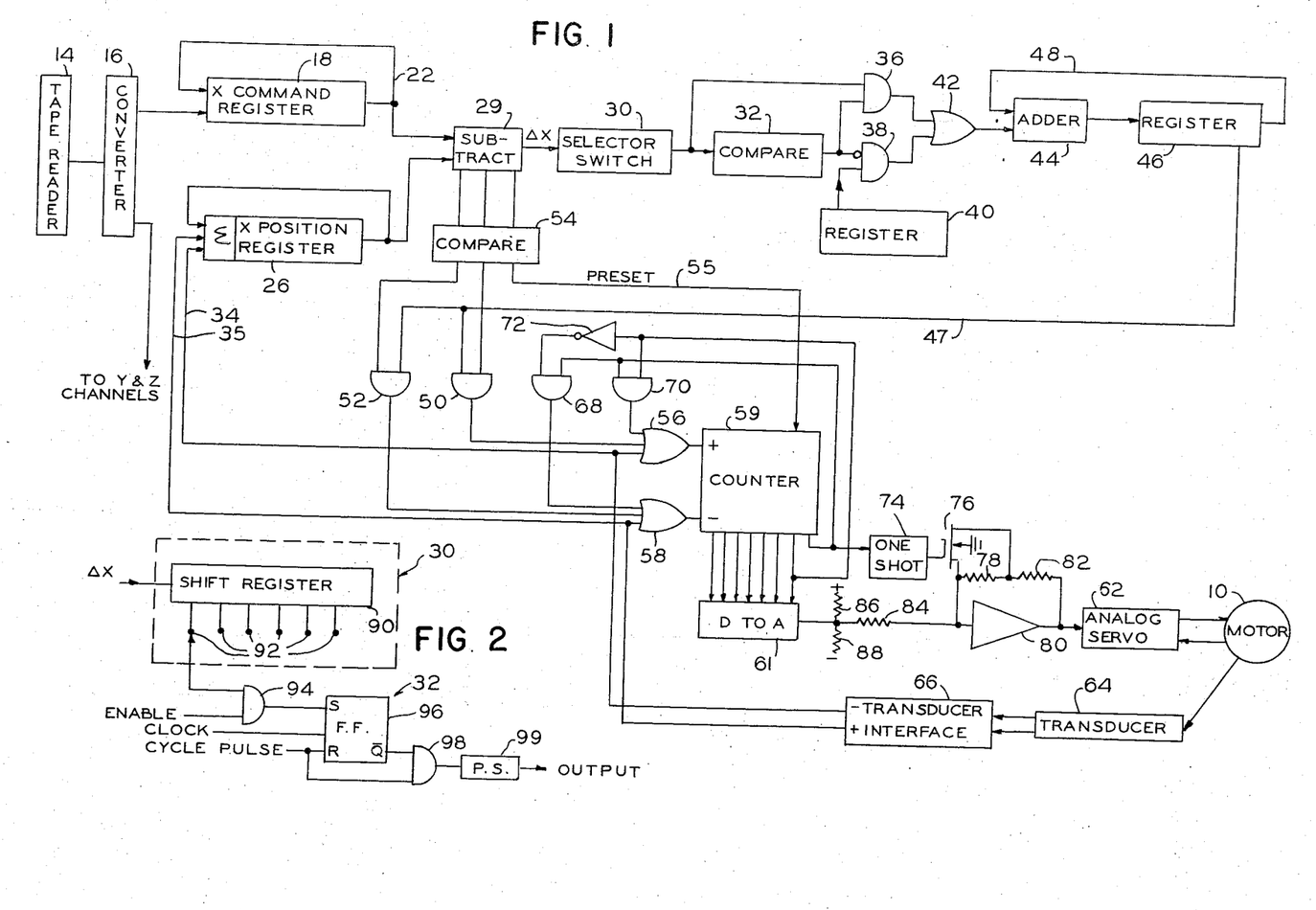
FIG. 1 is a block diagram illustrating a numerical control system according to the present invention.
FIG. 2 is a block diagram more fully illustrating a portion of the FIG. 1 system.

Referring to the drawings and particularly to FIG. 1, an apparatus is described for moving a controlled device along a path from one point to another, wherein the apparatus receives input directive information representing said path, and in particular, the end point of said path, for causing corresponding movement of the controlled device. In a given instance, the controlled device may comprise the cutting tool of a milling machine, or a drill bit, which it is desired to position as rapidly as possible prior to the beginning of a particular operation. In such instance, the contour of the path is of relatively secondary importance, with the main object in mind being the rapid positioning of the tool to an accurately predetermined point. Successive movement instructions may be provided upon a conventional recording tape (not shown), such as perforated paper tape, read by a tape reader 14. Successive "blocks" of information may be read from the tape in a known manner, with successive blocks including directive information indicative of the position to which the cutting tool or other controlled device is to be moved, and further instructions upon the operation to be performed after the tool is moved to such position. The information is conventionally recorded upon the tape in binary-coded-decimal form.

The input information from tape reader 14 is suitably converted from binary-coded-decimal form to straight binary form in converter 16 to simplify the processing of the information. This converter may be conventional or may be of the type set forth in my aforementioned application Ser. No. 66,979. The instructions may be recorded for a plurality of axes, i.e., orthogonal "X", "Y" and "Z" directions, but the circuit of only one coordinate channel is illustrated herewith and may be designated as an "X" channel. It is understood the other coordinate channel systems are substantially similar.

The X coordinate of the location to which the controlled device is to be moved is coupled into X command register 18. This register as well as most of the other registers employed herein, comprise 24 bit shift registers wherein the information stored continuously circulates, as indicated by feedback lead 22. The X command register 18 together with X position register 26 and subtract circuit 29 form an input register means according to the present invention. The position register 26 stores the digital coordinate representation of the actual position of the controlled device, this position register being connected as a dynamic counter such that inputs provided on leads 34 and 35 decrease and increase the contents of the register by one unit in a coordinate direction. Otherwise, the information circulates in the position registers in the same manner as hereinbefore described with respect to the command register.

Command register 18 and position register 26 provide respective inputs for subtract circuit 29, the latter developing the difference therebetween designated as $\Delta X$. The subtract circuit supplies as an output the digitally represented positional error in the X coordinate direction existing between the commanded position for a controlled device, and its actual position.

This difference, $\Delta X$, is provided via selector switch 30, compare circuit 32, and gates 36 and 42, as an input to a rate command means here comprising adder 44 driving a register 46. The rate command means may be viewed as a digital differential analyzer for repetitively adding the error information, $\Delta X$, to itself at a predetermined rate, wherein the output of or-gate 42 supplies the input $\Delta X$, and feedback lead 48 provides the previous sum accumulated in register 46. The output in the form of an overflow pulse is repetitively generated on lead 47 indicative of end overflow of the register 46. The rate command means 44, 46 is not employed here for interpolation purposes, but is rather more properly viewed as an error-to-frequency-converter. The output on lead 47 is then utilized as an input to error counter 59 forming part of a digital servomechanism for bringing about the rotation and positioning of X-axis motor 10. The advantage of frequency control of the servo rather than analog voltage control is that digital integration can be performed by error counter 59. This in turn means that high accuracy can be obtained with low servo loop gain. Another advantage is that feedrates will be generated with fairly high accuracy.

The overflow output of register 47 is applied as either a positive or negative input to counter 59 in accordance with the sign of $\Delta X$. Thus, if the X command register contains a larger number than the position register 26, then the sign of the difference will be positive and a portion of compare circuit 54 comprising a sign detector will operate and-gate 50 causing the output on lead 47 to be supplied to counter 59 via or-gate 56. On the other hand, if the sign of $\Delta X$ is negative, i.e., if the number in the command register 18 is less than the number in position register 26, then a sign detecting portion of compare circuit 54 will operate and-gate 52 whereby the output on lead 47 will be supplied to the negative or decreasing input of counter 59 by way of or-gate 58.

The counter 59 is a seven-stage binary counter (with an additional stage for indicating overflow condition), i.e., the counter counts from zero to 127 with the normal or servo rest position of the counter being 64. If a positive output is required to operate analog servo 62, the error counter will be at a count in the region 65 to 127. In case a negative output is required, the counter will be at a count between zero and 63. The deviation of the counter, from its center value, ("lag") is dependent upon the sensitivity of the servo, feedrate, acceleration and other factors.

The output of the error counter 59 is applied to a conventional digital-to-analog converter 61, which may comprise a resistive network, supplying an analog output via coupling resistor 84 and operational amplifier 80 to analog servo 62. The analog servo 62 comprises a conventional velocity servomechanism provided with power amplifier means for supplying an operating input to motor 10. The analog servo 62 also receives tachometer feedback from motor 10 and operates in a conventional manner for rotating motor 10 at substantially the dictated rate. The velocity dictated by the digital-to-analog converter is amplified and compared, analogwise, with the actual velocity of the machine, detected with the tachometer. The difference operates the motor. The input of amplifier 80 is biased by means of a voltage divider comprising resistors 86 and 88 such that a zero-movement-directing output is provided therefrom when digital-to-analog converter 61 receives the 64 count input.

A transducer 64 is also connected to the output shaft of motor 10, this transducer comprising means for providing digital rate and position feedback. The transducer is of a conventional type known as a digital incremental encoder, producing digital pulse outputs in response to analog input phased according to direction of rotation. In a particular embodiment, the transducer comprises a Baldwin shaft position encoder, Model 75Z-1, manufactured by Baldwin Electronics, Inc., Little Rock, Arkansas. The output of transducer 64 is coupled via transducer interface 66 (hereinafter more fully described) for supplying second inputs to error counter 59. Thus, as motor 10 responds to servo 62, transducer 64 provides pulses to error counter 59 for bringing the total count thereof towards a predetermined value for which converter 61 would produce zero output, indicating compliance with the input command. A positive output from the transducer interface, indicating positive rotation, is applied for reducing the count in counter 59 via or-gate 58, while the negative output of transducer interface 66 indicative of negative rotation is applied for advancing the contents of counter 59 via or-gate 56. The loop comprising the error counter 59, converter 61, amplifier 80, servo 62, transducer 64, and interface 66 thus constitutes a digital rate servomechanism causing the X motor 10 to be responsive to rate information dictated by the frequency of the output pulses from the error-to-frequency-converter comprising adder 44 and register 46. Also, the digital information from transducer 64 updates the position register 26 whereby the ΔX output from subtract circuit 28 continuously declines. ΔX is supplied via switch 30 where it may be coupled to the error-to-frequency-converter 44 via gates 36 and 42. However, as hereinafter more fully described, such input is usually employed in the case of relatively small positional error indications, i.e., relatively small values of ΔX.

When ΔX reaches or nears zero, subtract circuit 29 supplies an output detected by compare circuit 54 whereupon compare circuit 54 supplies a preset output on lead 65. This "detect zero" output on lead 55 causes the error counter to "jump" to its steady-state position by overriding any count in counter 59 and setting the counter contents to 64. The digital servomechanism then operates in a "servo-retaining" mode. Prior to the execution of this instruction, the error counter 59 may contain a count greater or less than 64 in accordance with the direction of the commanded movement and according to whether acceleration or deceleration may have been taking place. However, upon the "detect zero" on line 55, the count in the error counter is changed to 64 and the digital servomechanism is then employed to maintain this value in the error counter 59. During servo-retaining, error correcting voltages are produced proportional to positioning error. To enhance the servo-retaining mode, analog servo 62 is provided with increased amplifier gain, i.e., with an increased gain characteristic at this time, near zero input value. Consequently, any tendency for movement on the part of the X motor 10 will be countered by a strong output from analog servo 62 as error counter 59 changes at all from the 64 value. It is understood that this servo-retaining mode is employed at the conclusion of movement for holding the tool at a given position.

The control system of the present invention may be characterized as a type of optimized, nonlinear control or modified bang-bang servo having advantageous characteristics enabling rapid traverse of a tool to a particular position, with accurate locating of such tool at the end of its rapid movement. For accomplishing the rapid traverse, an increased signal is applied to analog servo 62 to accomplish most of the movement between the previous position and the commanded position. This increased input to the analog servo is not developed strictly in accordance with a greatly increased count in counter 59, inasmuch as this expedient would greatly increase the size of the counter and hence cost of the equipment. Rather, overflow of the normal range of counter 59 is detected for operating one-shot multivibrator 74 which in turn substantially increases the gain of operational amplifier 80. Operational amplifier 80 is provided with feedback resistors 78 and 82 in series, with field effect transistor 76 normally shunting or shorting out resistor 78. However, when one-shot multivibrator 74 operates, field effect transistor 76 is rendered nonconductive, placing resistor 78 in the circuit, increasing the gain of amplifier 80.

Figure 3:
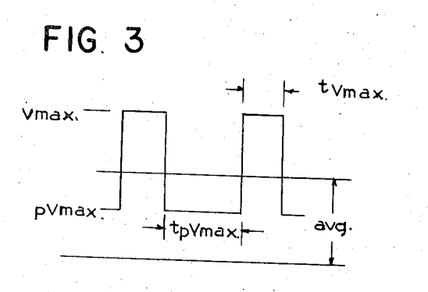
FIG. 3 is a waveform graph illustrating input to an analog servo portion of the present system, such graph plotting voltage against time.

Thus, with increasing lag in the system, the situation will arise wherein the counter 59 is at its limit position (127 or 00). According to the present invention, such limit condition causes the overflow which operates the one-shot multivibrator 74 and provides additional current to the servo. The effect of this additional current is the same as an increase in gain of the servo system. As negative feedback caused by rapid movement of motor 10 is produced by transducer 64 via transducer interface 66, the counter may "move away" from the limit. As may be seen, the result tends to be a pulse-width modulated output from amplifier 80 as shown in FIG. 3, which illustrates the voltage output of amplifier 80 with respect to time. Vmax. is the output of the amplifier when one-shot multivibrator 74 is operated, and $pV_{max.}$ is the typical voltage applied to the analog servo for a unit less than the limit in counter 59. $t_{Vmax.}$ and $t_{pVmax.}$ are the time periods for these respective voltage outputs. The average output is dependent on the time intervals for each of the two output components $pV_{max.}$ and $V_{max.}$. The duty cycle $t_{Vmax.}/(t_{pVmax.} + t_{Vmax.})$ will vary between zero and one for feedrates between $pV_{max.}$ and $V_{max.}$. With this type of operation, a substantial increase in linear range of servo operation is realized.

The one-shot multivibrator maintains the servo in the Vmax. input condition for predetermined periods of time, that is, $t_{Vmax}$. is at least the time period of one-shot multivibrator 74, for improving the performance of the apparatus. In general, a high enough input may be provided to counter 59 from register 47 such that a 100 percent duty cycle will result. Thus, one-shot multivibrator 74 will in many instances receive another input from overflow, i.e., actuation of the extra stage of counter 59, before the prior period of the multivibrator is over, whereby the output of multivibrator 74 will be maintained in its triggered condition. One-shot multivibrator 74 is of the type which will time-out its period from the most recently received input trigger.

The counter 59 is maintained substantially at its limit condition of "127" or "00" by means of a circuit including and-gates 68 and 70, and inverter 72. The same overflow output applied to one-shot multivibrator 74, indicative of a "128" or a "minus one" count in counter 59, is applied as an input at and-gates 68 and 70, respectively, having their outputs coupled to or-gates 58 and 56 driving the counter. An additional input is provided from the last of the principal seven stages of counter 59 to and-gate 70, as well as through inverter 72 to and-gate 68. In the event of a "128" count, the additional or eighth stage of counter 59 will provide an output or gate 68, while the seventh stage will provide a "zero" output which is inverted to a "one" by inverter 72. Consequently, and-gate 68 will be energized for supplying an input to counter 59, or-gate 58 causing the counter 59 to reduce by one count to the "127" position. In the event the counter drops to the count of minus one, the additional output will energize and-gate 70, in addition to a one output from the seventh counter stage, causing and-gate 70 to increase the count in counter 59 by one via or-gate 56. The counter will thus have repeated opportunities to provide its overflow output to one-shot multivibrator 74.

The motor 10 will thus rapidly traverse from a given point toward the commanded position, with the Vmax. output of amplifier 80 causing the motor 10 to provide a predetermined high point-to-point feedrate. In the case of a duty cycle of less than 100 percent, as illustrated in FIG. 3, the average feedrate will be proportional to the average voltage value as indicated. An optimally maximized feedrate is provided for high digital servo performance without requiring a large and expensive error counter. The rapid optimized feedrate can be well coordinated with deceleration to an accurately predetermined point, as hereinafter more fully described.

A situation of high duty factor is maintained for prolonging rapid traverse up to the optimized deceleration mode by supplying a relatively high "maximum number" as the input to the error-to-frequency-converter instead of the actual positional error indication, $\Delta X$. This "maximum number" is preselected in register 40, which may comprise a recirculating register. Such input is then supplied to adder 44 by way of and-gate 38 and or-gate 42 until the actual positional error indication, $\Delta X$, falls within a predetermined range reserved for deceleration. The selection of such deceleration range is made by selector switch 30 (hereinafter more fully described) which may be calibrated in inches and/or fractions of an inch as reserved to decelerate the controlled device to standstill. Selector switch 30 may in effect comprise a multiplier. The controlled device will thus rapidly move in an optimum manner toward the desired location in accordance with the maximum number contained in register 40, and the selection of deceleration range is suitably coordinated with such feedrate through the proper selection by switch 30. When the positional error indication, $\Delta X$, falls below the selected value, comparison circuit 32 provides an output inhibiting gate 38 and enabling gate 36 whereupon the error-to-frequency-converter 44, 46 is responsive to a decreasing positional error indication, $\Delta X$.

Figure 4:
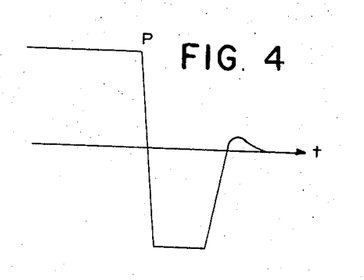
FIG. 4 is a waveform graph, to a different scale, also plotting voltage input to an analog servo against time, illustrative of deceleration operation according to the present invention.

The gain change on limit provided by counter 59, in conjunction with the frequency controlled feedrate, establishes the important function of optimized deceleration. For usual substantial initial errors, the output frequency of the error-to-frequency-converter will be at its maximum rate as determined by "max. number" in register 40 to effect rapid traverse. The maximum output frequency of register 46 will be maintained until the position error comes within a zone determined by the setting of selector switch 30, whereupon the output frequency of the error-to-frequency-converter 44, 46 will become proportional to the remaining position error, $\Delta X$. The effect of the gradually decreasing frequency output on the lead 47 is dependent on the mechanical characteristics, etc. of the particular servo system involved. In case of a servomechanism of high response, the effect will be a gradually decreasing voltage at the output of amplifier 80. However, for a servomechanism of relatively lower response, the output of amplifier 80 called for will be of the overall form illustrated in FIG. 4. At point P, when comparison circuit 32 switches the system to position error input to adder 44, full negative braking torque or plugging torque is demanded from the motor. This assumes that in the particular instance there will not be enough friction to decelerate fast enough without motor braking. As a result, a rapid deceleration is effected for optimizing the point-to-point movement. Shortly before final positioning, the positive driving torque will be reapplied, however, (assuming friction) in order to obtain smooth and accurate pull-in with no overshoot.

Considering operation of the system when the error-to-frequency converter 44, 46 switches to the $\Delta X$ input, the frequency of the output on line 47 drops appreciably whereby feedback from transducer interface 66 drives counter 59 negatively past zero. Counter 59 thus runs from a first condition, generally at the top count limit, to a a second condition at the bottom count limit. One-shot multivibrator 74 will again be operated, substantially continuously at first, and increase the gain of amplifier 80 such that maximum braking torque is applied via the analog servo 62 to motor 10. As the motor speed drops, and further as the position error $\Delta X$ decreases, maximum braking torque is no longer required and the system operates in the pulse mode as illustrated in FIG. 3, with counter 59 going in and out of the maximum negative condition. With further slowdown, operation comes within the counting range of counter 59 and the motor slows down in an adaptive manner, with velocity being fully proportional to the remaining distance-to-go as soon as the velocity comes below that resulting from pVmax. As a consequence, the slowdown is finally exponential with respect to time, as hereinafter more fully described, for accurate final location of the controlled device. Eventually a range is encountered where positive torque is applied to achieve positioning as friction is encountered, as seen at the right end of the curve in FIG. 4. After stopping, the device is held in position according to the servo-retaining feature hereinbefore mentioned.

Figure 5:
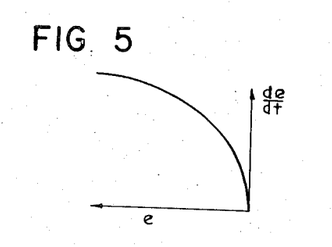
FIG. 5 is a graph plotting of velocity versus distance-to-go for a conventional bang-bang servo in a deceleration mode.

Deceleration will be further considered with the aid of the curves illustrated in FIGS. 5, 6, 7 and 8. Conventional bang-bang servos employ maximum forward speed followed by maximum deceleration or braking to the stop point and are frequently inaccurate with respect to exact final positioning, which may vary according to system constants. In a typical prior art bang-bang servo, the locus of deceleration points takes error as well as error rate into account. Maximum deceleration torque is applied for the entire deceleration period, and such servo would be ideally suited for point-to-point operation if all variables that affect the operation were known, i.e., friction, loading, motor constants, etc. However, these factors cannot be accurately predicted, and therefore existing bang-bang servos do not provide sufficient accuracy or repeatability of operation to be useful in accurate numerical control systems, but may be used to decelerate power drives and the like where exact end positioning is not critical as it is in the case of machining operations. The locus of deceleration points for a prior art bang-bang servo is illustrated in FIG. 5. With constant decelerating torque producing a constant deceleration, the velocity, $de/dt$, is parabolic with respect to the remaining distance, $e$, according to the relation $e = \frac{1}{2} v^2/a$, wherein $v = $ the velocity or $de/dt$, and $a = $ the constant deceleration. The velocity, $de/dt$, plotted with respect to time is linear as illustrated by the right-hand curve 100 in FIG. 7.

In accordance with completely adaptive deceleration, as employed in part herein and as set forth and claimed in my aforementioned application, Ser. No. 66,979 filed Aug. 26, 1970 for Numerical Control System, velocity is substantially linearly proportional to the remaining distance or distance-to-go to the final stopping point. The straight line $a$, $b$, $c$ illustrates this type of deceleration in FIG. 6, wherein velocity $de/dt$ is plotted against $e$, distance-to-go. In the case of such adaptive deceleration, the velocity, $de/dt$, is exponential with respect to time as illustrated by the curve, $a$, $b$, $c$ in FIG. 8 wherein velocity, $de/dt$, is plotted with respect to time. The curve in FIG. 8 to which reference is presently made is dashed between points $a$ and $b$, while being shown in full line between points $b$ and $c$. Such a curve is also illustrated, for example, at 102 in FIG. 7.

Figure 7:
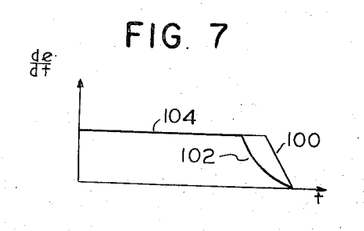
FIG. 7 is a graph plotting velocity versus time for a conventional bang-bang servo system in a deceleration mode, as well as such a curve for the present system, starting from a fairly low feedrate.
Figure 8:
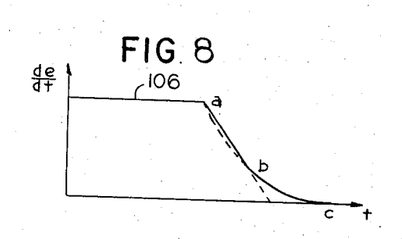
FIG. 8 is a graph plotting, in full-line, velocity versus time for the system according to the present invention in a deceleration mode starting from a fairly high feedrate.

In the decelerating mode according to the present circuit, operation can in some instances be entirely adaptive, i.e., wherein velocity is linearly proportional to the remaining distance-to-go or exponential with respect to time, for example in the case where deceleration starts from a relatively low traversing feedrate as illustrated at level 104 in FIG. 7. The deceleration is then amply illustrated by curve 102. This will be the case when the normal range of counter 59 is not exceeded for deceleration. However, in general, deceleration will start from a relatively high traverse feedrate as indicated at 106 in FIG. 8, whereby the normal range of counter 59 is exceeded in a negative direction, i.e., the contents of the counter drop below zero, resulting in the operation of one-shot multivibrator 74 and the application of full braking torque to motor 10. Thus, the velocity of the motor will be described by the straight line, shown in full, between points a and b in FIG. 8 rather than by the curved dashed line. At point b, the remaining position error, $\Delta X$, will be small enough so that the lower limit of the counter 59 is not always exceeded, and operation substantially shifts from the straight line $a$–$b$ in FIG. 8, to the exponential slowdown $b$–$c$ in FIG. 8. As heretofore mentioned, the transition is not immediate, but intermediate pulse-width modulation occurs at the input to the analog servo as indicated in FIG. 3. Thus, for a short period of time the counter 59 may go in and out of the limit condition. However, the final slowdown is exponential with respect to time, resulting in accurate positioning of the controlled device.

Figure 6:
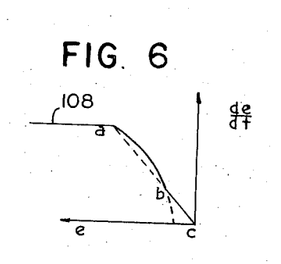
FIG. 6 is also a graph plotting, in full line, velocity versus distance-to-go in a deceleration mode of the system according to the present invention.

The plot of velocity, $de/dt$, with respect to e, the distance-to-go, is illustrated in FIG. 6 for the deceleration mode of the present invention, wherein deceleration takes place from rapid traverse feedrate 108 via the path $a$, $b$, $c$, as shown in full line. That is, full braking torque is applied between points $a$ and $b$ which correspond to points $a$ and $b$ in FIG. 8, resulting in a parabolic locus with respect to distance-to-go. At point $b$, the velocity will become substantially linearly proportional to such remaining distance-to-go.

Thus, as long as the linear dashed curve $a$–$b$ is to the left of the parabolic curve in FIG. 6, deceleration asked for exceeds the normal adaptive deceleration capability of the particular system, and the result will be a constant maximum decelerating torque. As soon as the linear curve "comes to the right" of the parabolic curve, maximum braking torque is no longer required. The pulse-width modulation of the type illustrated in FIG. 3 will take place for an intermediate time, and this in turn will change to fully proportional operation illustrated by segment $b$–$c$ in FIG. 6 as soon as the velocity $de/dt$ comes below that produced by $p$Vmax. As a result, switching from maximum deceleration to deceleration linear with respect to distance-to-go is automatic and produces accurate location without undue equipment expense. The overall position-to-position movement is very rapid with enhanced servomechanism accuracy derived from digital circuitry, and without requiring an error counter of excessive capacity.

Selector switch 30 and compare circuit 32 are illustrated in greater detail in FIG. 2. The selector switch 30 is essentially a multiplier which multiples by twos. In a particular embodiment the multiplier includes a shift register 90 for receiving the $\Delta X$ input for the input from register 40, the shift register having a plurality of output taps 92 for receiving the information from shift register stages along which the information is continuously shifted from left to right. Thus, movement of the movable tap to the right substitutes less significant bits for more significant bits in the stream sent to compare circuit 32, essentially multiplying $\Delta X$. The compare circuit 32 comprises a "J–K" flip-flop, as well known in the art, which changes the output provided thereby at the time a clock input is received, such change being in accordance with the set or reset input, S or R, theretofore present. The set input of flip-flop 96 is provided by and-gate 94 which receives one input from selector switch 30 and a second enable input which, in this instance, is "up" for the last 14 bits of each 24-bit word. If all the higher bits of the input from switch 30 are zero, that is, the 14 most significant bits, it is known that the input is within a 1,024 unit total, i.e., 1,023 or smaller. A cycle pulse is provided to reset input, R, of the J–K flip-flop at the end of each word, i.e., in a twenty-fifth bit position.

If all the higher order bits from switch 30 are zero, the flip-flop 96 will not be set and the normally up $\overline{Q}$ output will remain up. The next cycle pulse, applied to and-gate 98, along with $\overline{Q}$, will provide an output. If any of the higher order bits are not zero, then the J-K flip-flop will be set by and-gate 94, and $\overline{Q}$ will not come on in time to actuate and-gate 98 in conjunction with the next cycle pulse (even though the cycle pulse then causes $\overline{Q}$ to come on). Thus, in order to produce an output, $\overline{Q}$ must be already present before a cycle pulse. The output of and-gate 98 will thus be set up in the event the input, ΔX, as multiplied, is 1,023 or smaller, and is then applied through pulse stretcher 99 to enable and-gate 36 while inhibiting and-gate 38. The pulse stretcher 99 causes the output to be effective for a word length.

The "detect zero" portion of compare circuit 54 is substantially identical to compare circuit 32, except the enable signal for gate 94 is up for at least the last 23 of the 24 bit positions of each 24-bit word. If nearly all zeros are present, the $\overline{Q}$ output of J-K flip-flop 96 would remain up and the next cycle pulse will provide an output for and-gate 98. However, if any of these bits is not zero, then the J-K flip-flop will be set so that the $\overline{Q}$ output will not be provided in conjunction with the next cycle pulse. As hereinbefore indicated, the portion of the compare circuit for providing an input to gate 50 or gate 52 merely determines the sign of ΔX, i.e., whether the contents of command register 18 are larger or whether the contents of position register 26 are larger.

Figure 9:
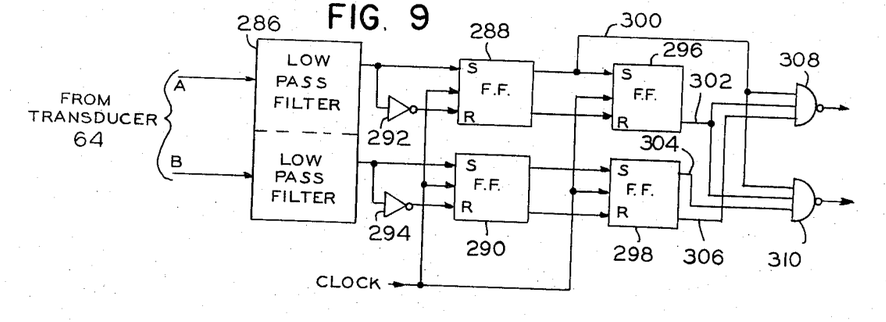
FIG. 9 is a block diagram of a transducer interface unit employed in the FIG. 1 system.

The transducer interface, numbered 66 in FIG. 1, is illustrated in greater detail in FIG. 9. Transducer 64 provides a pair of quadrature pulse outputs the "phase" of which is indicative of the direction of rotation of particular transducer. For example, during rotation of motor 10, transducer 64 will first produce a pulse output on line A, followed by an overlapping pulse output on line B. The FIG. 9 circuit differentiates these pulses and times the same in relation to the system clock.

The outputs A and B are coupled via low pass filters, indicated at 286, to flip-flops 288 and 290 respectively. The presence of a pulse sets one of the flip-flops, while its absence resets such flip-flop through an inverting amplifier 292 or 294. The flip-flops 288 and 290 are J-K flip-flops, as well known in the art, and will change the output provided thereby at the time a clock input is received. The flip-flops are also designed to have an approximately one volt built-in hysteresis characteristic so that the inputs applied thereto must change by such value in order to prospectively change a flip-flop from a set condition to a reset condition. This characteristic, together with employment of low pass filters 286, greatly enhances the noise immunity of circuit.

Let us assume that flip-flop 288 is set by a given A pulse. Flip-flop 288 will provide an output for setting flip-flop 296, and will also provide an output on line 300 to gates 308 and 310. Flip-flop 296 will not be set until the clock pulse following the one which sets flip-flop 288. Consequently, flip-flop 296 will provide a "not" output on line 302 until set by the next clock pulse. Two inputs for and-gate 308 will thus be energized and a third output on lead 306 is also provided as hereinafter indicated. Therefore, an output will be produced by and-gate 308, such output having a duration equal to the clock pulse period. When flip-flop 296 is "set" by the next clock pulse, the output from and-gate 308 is discontinued. The presence of an output from gate 308 will also indicate a first direction of rotation for motor 10. If the B pulse had been received first, there would have been no energizing output for gate 308 on lead 306 at this time.

On the other hand, if the X motor 10 had been turning in the opposite direction, flip-flops 290 and 298 would have operated in substantially the same manner as hereinbefore described for flip-flops 288 and 296. Consequently, a pulse output would be provided by flip-flop 298 on lead 304 for energizing and-gate 310 at the same time as inputs were present on leads 300 and 302. The resulting output from and-gate 310 would indicate the opposite direction of rotation for the X motor.

The pair of outputs provided by the transducer interface will step register 26 and error counter 59 in a direction dependent upon the sign of the output. Thus, a "positive" output from gate 308 will step register 26 and error counter 59 in a one direction, while an output from and-gate 310 will step register 26 and error counter 59 in the opposite direction. The transducer interface circuitry disclosed is found to provide substantial noise immunity as well as well defined pulses suitable for counting, and unfailingly delivers a proper output pulse without generation of undesired extra pulses sometimes encountered with circuitry employing Schmitt triggers and the like.

While I have shown and described a preferred embodiment of my invention, it will be apparent to those skilled in the art that many changes and modifications may be made without departing from my invention in its broader aspects. I therefore intend the appended claims to cover all such changes and modifications as fall within the true spirit and scope of my invention.

I claim:

1. In apparatus for moving a controlled device along a path between two points,
   rate command means for generating an output having a rate to which movement of said controlled device is responsive,
   digital servomechanism means, and a positioning motor operated thereby, responsive to the output of said rate command means to provide movement of said controlled device,
   said digital servomechanism means receiving feedback in accordance with movement of said controlled device, said
   digital servomechanism means having a first range of response to the difference between rate commanded and feedback,
   and means for non-proportionately increasing the response of said digital servomechanism means as said difference exceeds said range.

2. The apparatus according to claim 1 including means for causing said rate command means to provide a first output,
   means for detecting when a given positional error remains,
   and means responsive to such detection for causing said rate command means to provide an output related to remaining positional error.

3. The apparatus according to claim 2 wherein said means for detecting when a given positional error remains includes register means for receiving input information and providing a digital positional error indication between input information and the actual position of the controlled device.

4. The apparatus according to claim 5 wherein said rate command means comprises an error-to-frequency-converter for supplying a pulse output.

5. The apparatus according to claim 1 wherein said digital servomechanism means includes an error counter.

6. The apparatus according to claim 5 including means for detecting a near center rest content of said error counter and in response thereto setting said error counter to the center rest value, said digital servomechanism means having increased gain in response thereto.

7. The apparatus according to claim 1 wherein said digital servomechanism means includes a counter having a normal capacity on each side of a center rest value, said means for non-proportionately increasing the response of said digital servomechanism means including means for detecting a count in said counter exceeding normal capacity and in response thereto increasing the gain of said digital servomechanism means.

8. The apparatus according to claim 7 wherein said means for detecting a count includes delay means operable when the contents of the counter exceeds normal capacity for providing an output of predetermined length each time the counter capacity is exceeded.

9. The apparatus according to claim 7 further including means for restoring the count in said counter to said normal capacity in response to a count in said counter exceeding said normal capacity.

10. The apparatus according to claim 7 wherein said counter is provided with an additional stage for detecting overflow beyond said normal capacity.

11. The apparatus according to claim 10 wherein said means for detecting a count includes delay means operable by said additional counter stage for providing an output of predetermined length each time the counter capacity is exceeded.

12. The apparatus according to claim 11 wherein said delay means comprises a one-shot multivibrator.

13. The apparatus according to claim 7 wherein said digital servomechanism means includes an amplifier and an analog servomechanism means driven by said amplifier for actuating said motor, and wherein the gain of said amplifier is increased by a count in said counter exceeding normal capacity.

14. The apparatus according to claim 13 wherein said digital servomechanism means further includes a digital-to-analog converter driven by said counter, wherein said amplifier comprises an operational amplifier normally having a first magnitude of feedback, and wherein the gain of said amplifier is increased by decreasing said feedback.

15. The apparatus according to claim 14 wherein said operational amplifier is provided with a feedback resistor, and means normally shunting said feedback resistor operable for increasing the gain of the amplifier through inhibition of its shunting action.

16. The apparatus according to claim 1 including register means for receiving input information and providing a digital positional error indication between input information and the actual position of the controlled device,
and wherein said rate command means comprises an error-to-frequency-converter for supplying a pulse output proportional to said positional error indication.

17. The apparatus according to claim 16 further including means for applying feedback in said input register means in accordance with movement of said controlled device.

18. The apparatus according to claim 16 wherein said error-to-frequency-converter includes a register for providing an overflow output, and adding means for repetitively adding said positional error indication to said register.

19. The apparatus according to claim 18 further including means for inhibiting application of the positional error indication to said adding means when said positional error is more than a selected value while providing a fixed input to said adding means when said error indication exceeds said selected value, causing the output of said error-to-frequency-converter to be proportional to the positional error indication near the end point of point-to-point movement for said controlled device for bringing about deceleration thereof.

20. The apparatus according to claim 19 wherein said means, for inhibiting application of the positional error indication to said adding means when said positional error is more than a selected value, includes selector switch means for multiplying said positional error, and comparison means for comparing the multiplied positional error with a given value.

21. In apparatus for moving a controlled device along a path between two points,
digital servomechanism means, and a positioning motor operated thereby, responsive to a commanded rate to provide movement of said controlled device,
said digital servomechanism means receiving feedback in accordance with movement of said controlled device, said digital servomechanism means having a first range of response to the difference between the commanded rate and feedback,
and means for non-proportionately increasing the response of said digital servomechanism means as said difference exceeds said range.

22. The method of operating apparatus for moving a controlled device along a path between first and second points by means of a motor, said method comprising:

rapidly traversing the controlled device from the first point generally toward the second point for a predetermined proportion of said path,
applying predetermined reverse torque to said motor at the conclusion of said predetermined proportion of said path for decelerating said device,
digitally determining the remaining distance-to-go to the second point,
and digitally controlling the velocity of said controlled device to be in direct proportion to the remaining distance-to-go to the second point, as the velocity of said controlled device falls below a given low value.

23. The method according to claim 22 including digitally detecting the ability of the controlled device to follow, within predetermined lag limits, a velocity proportional to said distance-to-go, and wherein the attainment of said given low value of velocity is detected according to said detected ability of the controlled device to follow, within said predetermined lag limits, a velocity proportional to said distance-to-go, after which said velocity of said controlled device becomes substantially proportional to said distance-to-go.

24. The method of operating servomechanism apparatus for moving a controlled device along a path between first and second points, comprising traversing the controlled device from the first point generally toward the second point at a first value of servomechanism gain for a lag of the controlled device within predetermined limits, and substantially increasing the effective gain of the servomechanism apparatus to a second value when said lag exceeds said predetermined limits.

25. The method of operating servomechanism apparatus for moving a controlled device along a path between first and second points, comprising traversing the controlled device from the first point generally toward the second point at a first value of servomechanism gain for a lag of the controlled device within predetermined limits, while substantially increasing the effective gain of the servomechanism apparatus to a second value when said lag exceeds said predetermined limits, and including decreasing the velocity of said controlled device as said device comes within a predetermined distance of said second point while continuing to provide said first value of servomechanism gain for a lag of the controlled device within predetermined limits and substantially increasing the effective gain of the servomechanism apparatus to a second value when said lag exceeds said predetermined limits, wherein said decreasing velocity is determined in accordance with the remaining distance-to-go within said predetermined distance.

* * * * *

UNITED STATES PATENT OFFICE
CERTIFICATE OF CORRECTION

PATENT NO. : 3,835,360
DATED : September 10, 1974
INVENTOR(S) : William B. Kiwiet It is certified that error appears in the above-identified patent and that said Letters Patent are hereby corrected as shown below:

Column 5, line 66, "65" should be --55--.

Column 7, line 29, "or" should be --to--.

Column 11, line 15, delete "set".

Column 13, line 7, "claim 5" should be --claim 3--.

Signed and Sealed this twenty-fifth Day of November 1975

[SEAL]

Attest:

RUTH C. MASON
Attesting Officer

C. MARSHALL DANN
Commissioner of Patents and Trademarks